United States Patent
Manning Cassett et al.

(10) Patent No.: US 8,532,610 B2
(45) Date of Patent: Sep. 10, 2013

(54) METHOD AND APPARATUS FOR MONITORING USAGE PATTERNS OF A WIRELESS DEVICE

(75) Inventors: Tia Manning Cassett, San Diego, CA (US); Kenny Fok, San Diego, CA (US); Eric Chi Chung Yip, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 12/881,341

(22) Filed: Sep. 14, 2010

(65) Prior Publication Data
US 2010/0330954 A1 Dec. 30, 2010

Related U.S. Application Data

(63) Continuation of application No. 11/374,888, filed on Mar. 13, 2006, now Pat. No. 7,817,983.

(60) Provisional application No. 60/660,965, filed on Mar. 14, 2005.

(51) Int. Cl.
*H04M 11/00* (2006.01)

(52) U.S. Cl.
USPC .......................................... 455/405; 709/224

(58) Field of Classification Search
USPC ................. 455/405, 407, 410, 411, 418, 423; 709/224
See application file for complete search history.

(56) References Cited

U.S. PATENT DOCUMENTS

| | | | |
|---|---|---|---|
| 5,949,415 A | 9/1999 | Lin et al. | |
| 2005/0097209 A1* | 5/2005 | McDonagh et al. | 709/224 |
| 2005/0246439 A1 | 11/2005 | Fong et al. | |

FOREIGN PATENT DOCUMENTS

| | | |
|---|---|---|
| EP | 1460512 A2 | 9/2004 |
| JP | 09065386 | 3/1997 |
| JP | 2003233589 | 8/2003 |
| WO | 03096729 A1 | 11/2003 |

OTHER PUBLICATIONS

International Search Report and Written Opinion—PCT/US06/009784, International Search Authority—European Patent Office—Jul. 25, 2006.

* cited by examiner

*Primary Examiner* — Sam Bhattacharya
(74) *Attorney, Agent, or Firm* — Stanton Braden

(57) ABSTRACT

Apparatus and methods for monitoring usage patterns of a wireless device may include a usage monitoring and reporting module operable to monitor and log usage on a wireless device based on a received usage configuration. Further, based on the usage configuration, the wireless device may forward the log to another device operable to analyze the log and generate a usage pattern report viewable by an authorized user.

89 Claims, 6 Drawing Sheets

METHOD AND APPARATUS FOR MONITORING USAGE PATTERNS OF A WIRELESS DEVICE

CLAIM OF PRIORITY UNDER 35 U.S.C. §120

The present Application for Patent is a continuation of patent application Ser. No. 11/374,888 entitled "Method and Apparatus for Monitoring Usage Patterns of a Wireless Device," filed Mar. 13, 2006, which claims priority to Provisional Application No. 60/660,965 entitled "Method and Apparatus for Providing Usage Pattern for a Wireless Device," filed Mar. 14, 2005, both of which are assigned to the assignee hereof and both are hereby expressly incorporated by reference herein.

BACKGROUND

The described embodiments generally relate to wireless communication devices and computer networks. More particularly, the described embodiments relate to the collecting usage statistics on a wireless device.

Wireless networking connects one or more wireless devices to other computer devices without a direct electrical connection, such as a copper wire or optical cable. Wireless devices communicate data, typically in the form of packets, across a wireless or partially wireless computer network and open a "data" or "communication" channel on the network such that the device can send and receive data packets. The wireless devices often have wireless device resources, such as programs and hardware components, which individually and cooperatively operate to use and generate data in accordance to their design and specific protocol or configuration, such as using open communication connections to transmit and receive data on the network.

Wireless devices are being manufactured with increased computing capabilities and are becoming tantamount to personal computers. These "smart" wireless devices, such as cellular telephones, have application programming interfaces ("APIs") installed onto their local computer platform that allow software developers to create software applications that operate on the cellular telephone. The API sits between the wireless device system software and the software application, making the cellular telephone functionality available to the application without requiring the software developer to have the specific cellular telephone system source code.

As the functionality and the bandwidth requirement of wireless devices has grown far beyond the requirements of a cellular telephone, the need to manage the bandwidth, maintenance and service of the wireless network has become critical to maintaining quality of service to the user and to maintain and increase the profitability of the network carrier. Accordingly, it would be advantageous to provide apparatus and methods for providing consumer usage pattern reports for a wireless device.

SUMMARY

The described embodiments comprise apparatus, methods, computer readable media and processors operable to monitor and log wireless device usage data that may be used to generate usage pattern reports relating to the occurrence of predetermined activities on the wireless device, including one or more of what activities occur, when the activities occur, as well as the frequency and duration of the activities. For example, the usage pattern reports may identify trends in where users make their calls, the time and length of calls, websites accessed, and content and software downloaded and utilized on the device. The usage pattern report may be used, for example, to make informed decisions regarding products and services to provide to the device, and/or network design relating to the usage of the device.

In one aspect, a method of determining a usage pattern of a wireless device on a wireless network may include obtaining on a wireless device a configuration that comprises a usage parameter and a reporting parameter, wherein the usage parameter identifies wireless device usage data to be monitored. The method further includes logging the identified usage data into a log based upon the usage parameter. Additionally, the method includes forwarding, based upon the reporting parameter, the usage log to another device to analyze usage patterns of the wireless device. In a related aspect, a machine readable medium may comprise instruction which, when executed by a machine, cause the machine to perform the above-stated operations. In another related aspect, at least one processor may be configured to perform the above-stated operations.

In a further aspect, a wireless device may comprise means for obtaining on a wireless device a configuration that comprises a usage parameter and a reporting parameter, wherein the usage parameter identifies wireless device usage data to be monitored. Additionally, the wireless device may include means for logging usage data into a log based upon the usage parameter. Also, the wireless device may include means for forwarding, based upon the reporting parameter, the usage log to another device to analyze usage patterns of the wireless device.

In another aspect, a wireless device may comprise a memory and a usage monitoring and reporting module resident in the memory. The usage monitoring and reporting module may include a usage configuration and monitoring logic operable to monitor wireless device usage based upon the usage configuration. Additionally, the usage monitoring and reporting module may include log generating logic operable to generate a memory resident usage log comprising usage data based upon the usage configuration. Further, the usage monitoring and reporting module may include reporting logic operable to transfer, based on the usage configuration the usage log to another device to analyze wireless device usage patterns.

In yet another aspect, a method of monitoring usage patterns of a wireless device may comprise generating a usage configuration executable to initiate monitoring, logging, and reporting of usage data on a wireless device. The usage configuration may identify a usage parameter and a reporting parameter. The method may further include forwarding the usage configuration for receipt by the wireless device, and receiving a generated usage log from the wireless device based on the usage configuration. Additionally, the method may include generating a usage pattern report based on the received usage log. In a related aspect, a machine readable medium may comprise instruction which, when executed by a machine, cause the machine to perform the above-stated operations. In another related aspect, at least one processor may be configured to perform the above-stated operations.

In a further aspect, an apparatus may comprise a means for generating a usage configuration executable to initiate monitoring, logging, and reporting of usage data on a wireless device. The usage configuration may identify a usage parameter and a reporting parameter. The apparatus may further include a means for forwarding the usage configuration for receipt by the wireless device, and a means for receiving a generated usage log from the wireless device based on the usage configuration. Additionally, the apparatus may include a means for generating a usage pattern report based on the received usage log.

In still another aspect, an apparatus for managing the monitoring of a usage of a wireless device comprises a configuration generator operable to generate and transmit a usage configuration for receipt by a wireless device. The usage configuration may identify a usage parameter to monitor and a reporting parameter. Further, the apparatus may include an information repository operable to receive and store a log, where the log comprises wireless device usage information based on the usage configuration. Additionally, the apparatus may include a usage pattern control module comprising an analyzer operable to generate a usage pattern report based on the log.

In still other aspects, a machine-readable medium comprises a first and second set of executable instructions. The first set of executable instructions, when executed by a machine, cause the machine to perform operations comprising generating a usage configuration executable to initiate monitoring, logging, and reporting of usage data on a wireless device, the usage configuration identifying a usage parameter and a reporting parameter. Further, the first set of instructions, when executed, by the machine, cause the machine to forward the usage configuration for receipt by the wireless device. Additionally, the first set of instructions, when executed by the machine, cause the machine to receive a generated usage log from the wireless device based on the usage configuration. Additionally, the first set of instructions, when executed by the machine, cause the machine to generate a usage pattern report based on the received usage log. The second set of executable instructions, when executed by the wireless device, cause the wireless device to perform operations comprising obtaining the usage configuration, logging the usage data into a log based upon the usage parameter, and forwarding, based upon the reporting parameter, the usage log to the first machine to analyze usage patterns of the wireless device.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

Figure 1:
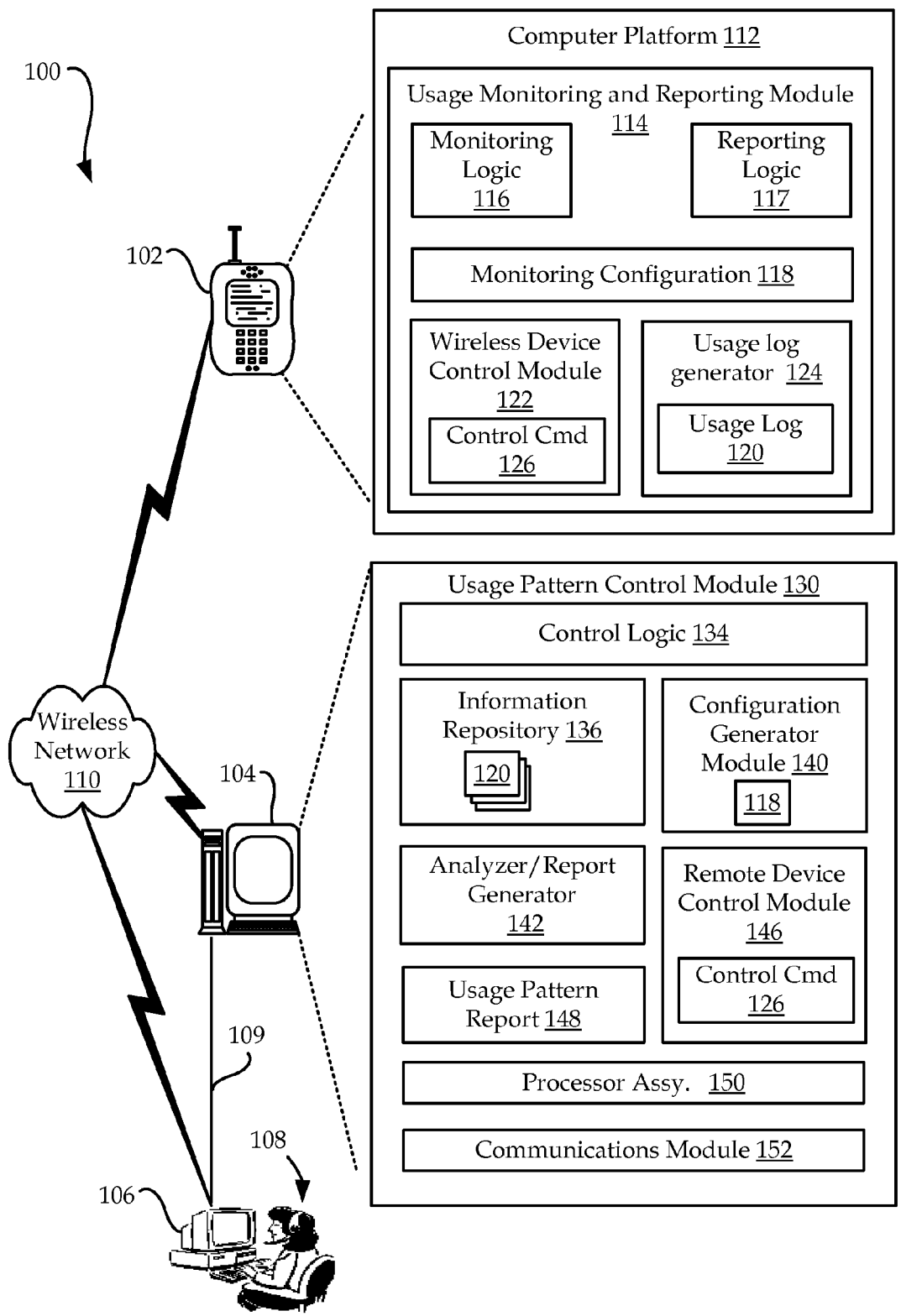
FIG. 1 is a schematic diagram of one aspect of a system for providing usage pattern information for a wireless device.

FIG. 1 illustrates one aspect of a system 100 comprising apparatus and methods of gathering, analyzing and reporting on the usage patterns of a wireless device based upon a downloaded configuration. System 100 is operable to monitor, log, upload and analyze wireless device usage data as directed by a downloadable configuration generated by a usage pattern manager server. The wireless device may be configured to collect usage pattern data after receiving consent of the registered owner of the wireless device. Further, the system 100 is further operable to generate a usage pattern report available for viewing, such as by the usage pattern manager server or any other authorized party. The report may be used, for example, to evaluate wireless device performance and/or more efficiently manage the wireless network, including: planning for cell site, development and equipment purchasing, providing improved customer service and targeted marketing, and determining network usage capacity. Additionally, for example, the report may provide useful marketing information for entities providing content and/or services that are consumed by the wireless device.

Generally, system 100 may include a wireless device 102 in communication with a usage pattern manager server 104, which provides device control functionality, via a wireless network 110. Further, usage pattern manager server 104 may be in communication with a user workstation 106, operated by an authorized user, such as a authorized user 108, who is provided access to the functionality of usage pattern manager server 104, via a wired connection 109 or through wireless network 110, and who may, via user workstation 106, communicate with wireless device 102.

Usage pattern data comprises any information relating to activity on the wireless device, such as what activity is occurring, when the activity occurs, and how often the activity occurs, i.e. the frequency, and/or how long the activity occurs, i.e. the duration. The activity may comprise at least one of a call-related activity, a messaging-related activity, a browser-related activity, and a software application-related activity. For example, usage pattern data may track information relating to voice calls, video calls, text messages, the uploading and downloading of content, and the execution and usage of the content and/or applications. Usage pattern data may include, for example, a predetermined time-based parameter associated with the monitored and/or collected information, such as a time-of-day and/or a day and/or a date. Further, usage pattern data may include, for example, a measure of how often the activity occurs, such as a count over a predetermined time period, a length of each given activity, etc. For instance, usage pattern data may include, but are not limited to monitoring and logging time of day calls are being made; the average length of calls; a location from where calls are made/received, for example, global positioning (GPS) fix and cell site info such as pseudo noise (PN) offset, system identification (SID), network identification (NID) and base station identification (BSID); which websites are being accessed, when, and how often; and what software and/or applets are being downloaded and executed, when and how often. The usage pattern monitoring parameters are user configurable and may be downloaded from usage pattern manager server 104. Thus, the usage pattern data are collected and analyzed in an attempt to provide insight into a usage pattern, i.e. an occurrence of a predetermined activity, time-based data associated with the occurrence, a duration of the predetermined activity, a frequency of the occurrence, and a geographic location associated with the occurrence, relating to a device, a device user, and/or a given activity.

The device may include any form of wireless device or computer module, including a wired or wireless communication portal, including without limitation, wireless modems, PCMCIA cards, access terminals, personal computers, telephones, or any combination or sub-combination thereof.

Figure 2:
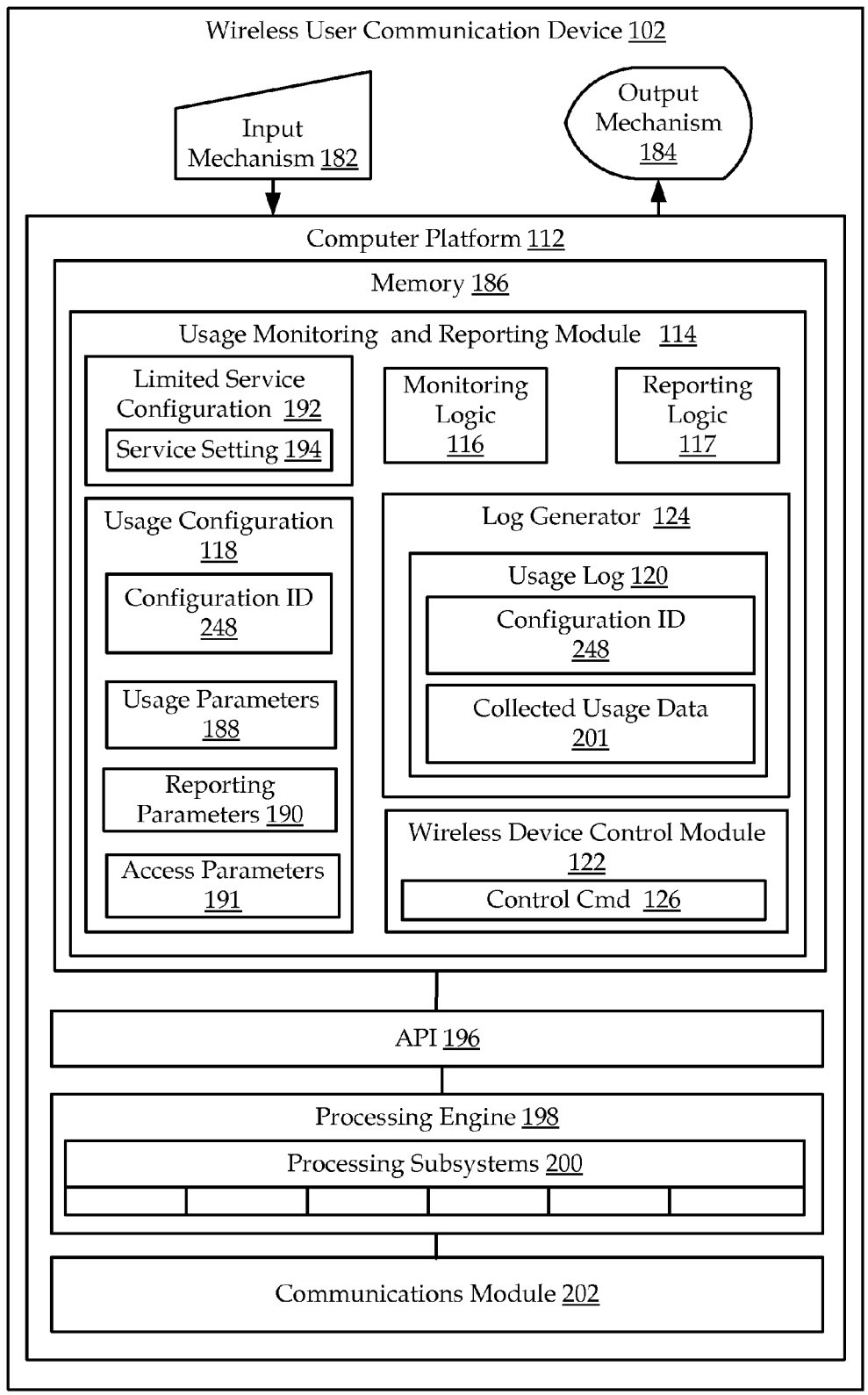
FIG. 2 is one aspect of an architecture diagram of the wireless device of FIG. 1.

Referring to FIG. 2, wireless device 102 may include computer platform 112 operable to transmit data, i.e., usage pattern data logs, across wireless network 110, and receive and execute software applications and configurations, i.e. usage pattern monitoring module 114 and usage pattern usage configuration 118.

Wireless device 102 may include any type of computerized, wireless device, such as cellular telephone 102, personal digital assistant, two-way text pager, portable computer, and even a separate computer platform that has a wireless communications portal, and which also may have a wired connection to a network or the Internet. The wireless device can be a remote-slave, or other device that does not have an end-user thereof but simply communicates data across the wireless network 110, such as remote sensors, diagnostic tools, and data relays.

Wireless device 102 may also include input mechanism 182 and output mechanism 184 interconnected to computer platform 112. Input mechanism 182 is operable to generate an input into wireless device 102, and may include a mechanism such as a key or keyboard, a mouse, a touch-screen display, and a voice recognition module. Output mechanism 184, may include a display, an audio speaker, and a haptic feedback mechanism, for example, for relaying information to the user of the wireless device 102.

Computer platform 112 may also include a memory 186, which may comprise volatile and nonvolatile memory such as read-only and/or random-access memory (RAM and ROM), EPROM, EEPROM, flash cards, or any memory common to computer platforms. Further, memory 186 may include one or more flash memory cells, or may be any secondary or tertiary storage device, such as magnetic media, optical media, tape, or soft or hard disk. Additionally, memory 186 may be operable to store original equipment manufacturer supplied instructions as well as third party client applications downloaded via network 110 or loaded via a personal computer (PC).

Further, computer platform 112 may include a processing engine 198, which may be an application-specific integrated circuit ("ASIC"), or other chipset, processor, logic circuit, or other data processing device. Processing engine 198 is operable to execute an application programming interface ("API") layer 196 that may interface with any resident programs, such as usage monitoring and reporting module 114, stored in memory 186. In one aspect, API 196 is a runtime environment executing on the respective wireless device. One such runtime environment is Binary Runtime Environment for Wireless® (BREW®) software developed by Qualcomm, Inc., of San Diego, Calif. Another example includes the Java 2 Micro Edition (J2ME) APIs, such as those supported by the Symbian OS (operating system) software. Other runtime environments may be utilized that, for example, operate to control the execution of applications on wireless computing devices.

Processing engine 198 includes various processing subsystems 200 embodied in hardware, software, firmware, executable instructions, data, and combinations thereof, that enable the functionality of wireless device 102 and the operability of the wireless device on wireless network 110. For example, processing subsystems 200 allow for initiating and maintaining communications, and exchanging data, with other networked devices. In one aspect, such as in a cellular telephone, processing engine 198 may include one or a combination of processing subsystems 200, such as: sound, nonvolatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface (UI), sleep, limited services, security, authentication, USIM/SIM, voice services, graphics, USB, multimedia such as MPEG, GPRS, etc.

For the disclosed aspects, processing subsystems 200 may include any subsystem components that interact with applications executing on computer platform 112. For example, processing subsystems 200 may include any subsystem components that receive data reads and data writes from API 196 on behalf of the resident usage pattern monitoring module 114. Further, at least a portion of information relating to usage data gathered and logged in log 120, may be available from one or some combination of these subsystems 200.

For example, in some aspects, call time and length records can be generated using timestamps of when calls begin and end and can be retrieved from "over the air" (OTA) messages retrieved through the diagnostic subsystem and its BREW® extension. The timestamp information may be used to calculate the time and length of calls. Furthermore based upon parameters set in usage configuration 118, usage data may be gathered for at least one of incoming and outgoing calls. It should be noted, however, that call-related information may be gathered from one or more of a plurality of processing subsystems, for example, from the Diagnostic, Call Manager, System Determination, and/or User Interface subsystems of a cellular telephone.

Furthermore, for example, in some aspects the usage monitoring and reporting module 114 may use OTA messages to determine when the wireless device is in a call. Once the wireless device 102 is in a call, the location of the wireless device 102 may be determined and logged, for example, using information retrieved from processing engine 198 and/or one or more processing subsystems 200. For example, location information may be included in processing subsystems such as a global positioning system (GPS) system monitor, and a diagnostic system monitor. Such location determining information may include a GPS fix, such as longitude and latitude information, and cell site and/or network information such as pseudo noise (PN) offset, network identification (NID), system identification (SID), and base station identification (BSID). In some aspects, the detection of a call may trigger the retrieval of the location information, which may be a value currently resident in one or more processing subsystems or which may be a value that is updated based on the triggering call event. In some aspects, wireless device 102 may include modules for determining location information, these modules including one or more of: a Global Positioning System (GPS); an Assisted GPS (A-GPS) system, such as the QPoint™ Positioning Software and gpsOne® hybrid Assisted GPS wireless location technology available from Qualcomm, Inc., San Diego, Calif.; and Localization Based Systems (LBS) such as Cell-ID, Enhanced Observed Time Difference (E-OTD), and Observed Timed Difference of Arrival (OTDOA).

In addition, the usage monitoring and reporting module 114 may be operable to determine when a new software application and/or applet has been downloaded, for instance, based on status changes in system components of wireless device 102. For example, when a software application and/or applet is downloaded, the total free electronic file storage (EFS) or any media storage may decrease. Changes in the EFS or other media may be detected through the EFS or other media system monitor and its BREW® extension. Furthermore, at the time a software application and/or applet is downloaded, the application/applet may be added to the application/applet list in the UI subsystem and usage monitoring and reporting module 114 may retrieve the application/ applet list through the UI system monitor and its BREW® extension. The usage monitoring and reporting module 114 is operable to detect either of these changes and may at that time retrieve and log the application/applet name. In other examples, the usage monitoring and reporting module 114 may be in communication with a dynamic software manager module on the device, and/or with one or any combination of application-related subsystems, which provide information on the addition, deletion and usage (what, when, frequency, duration) of software on the device.

Furthermore, in another example, the usage monitoring and reporting module 114 may be operable to log accessed websites based upon the IP packets comprising the messages and data sent over the TCP/IP network. A destination IP address is associated with every IP packet and transmitted IP packets may be retrieved through the data services system monitor and its BREW® extension, and this IP address may then be logged as part of the usage log 120. In a further example, the usage monitoring and reporting module 114 may be operable to communicate with predetermined APIs utilized by a browser application when exchanging data packets in order to gather and log web-based activity. Additionally, in yet another example, the usage monitoring and reporting module 114 may be operable to gather web-based activity information from data service logs, such as may be stored within a processing subsystem, such as a Diagnostic subsystem.

It should be noted that all of the above examples are provided for illustrative purposes only, and that the usage monitoring and reporting module 114 may be operable to communicate with any functional component associated with the wireless device 102 in order to collect and log the configured usage data.

Computer platform 112 may further include a communications module 202 embodied in hardware, software, executable instructions, data, and combinations thereof, operable to enable communications among the various components of the wireless device 102 and wireless network 110. Communications module 202 may comprise any component/port/interface that may include any point of entry into, and/or any point of exit from wireless device. As such, communications module 202 may include interface components for hardwired communications and for wireless communications. Further, communications module 202 may include any air-interface components, such as a signal transmitter, a signal receiver, a signal modulator and/or a signal demodulator, along with the associated electronics.

Based on configuration 118, monitoring logic 116, and reporting logic 117, usage monitoring and reporting module 114 is operable to monitor usage of the wireless device 102 and report the usage to the usage pattern manager: server module 104. The usage monitoring and reporting module 114 may be loaded into memory 186 by various mechanisms including, but not limited to, being downloaded from any computer device connected to wireless network 110, and being statically loaded on the wireless device 102 prior to delivery to the end user, such as at the time of manufacture. Computer devices from which usage monitoring and reporting module 114 may be downloaded include usage pattern manager server module 104 and user workstation 106.

In one aspect; configuration 118 may include usage parameters 188 which identify data to log relating to a predetermined activity occurring on the wireless device 102. The collected usage data 201 are stored by log generator 124 in usage log 120. As noted above, the collected usage data 201 comprises any information relating to activity on the wireless device, such as what activity is occurring, when the activity occurs, how often the activity occurs, i.e. the frequency, and/or how long the activity occurs, i.e. the duration. Additionally, the usage log 120 may include a record of the given configuration ID 248 that relates to the given usage parameters 188 and/or reporting parameters 190 associated with the collected usage data 201.

As such, in some aspects, configuration 118 may comprise reporting parameters 190 operable to configure usage monitoring, and reporting module 114 to selectively transmit log 120 to usage pattern manager server module 130 across wireless network 110. The timing of log transmission is non-limiting and may be transmitted at a predetermined time, a predetermined interval, a predetermined schedule, and on the occurrence of predetermined events, such as upon establishing a communication channel with communications network 110 and upon power up, and upon some threshold setting. Further, reporting parameters 190 may determine whom to allow access to log 120, for example, to access memory 186 and retrieve log 120. Such authorized users may include a specific remote device such as the usage pattern manager server 104 and user workstation 106. In addition, reporting parameters 190 may include a parameter operable to control the deletion the accumulated logs 120. For example, log 120 may be deleted automatically upon uploading to a usage pattern manager server 104, upon reaching a certain memory size, and upon a control command 126 received from the usage pattern manager server 104 and user workstation 106.

In one aspect, log 120 is transmitted over an open communication connection between the wireless device 102 and the wireless network 110, "piggybacking" on an ongoing voice or data call across an open connection. Alternatively, in a cellular network, configuration, the log 120 may be transmitted to usage pattern control module 130 through short message service ("SMS"). Furthermore, as noted above, another aspect of the usage pattern manager server module may "pull" the log 120 from the wireless device 102 across the network 110 on a scheduled or ad hoc basis.

Usage monitoring and reporting module 114 further includes wireless device control module 122 operable to generate/detect a control command 126, such as an acknowledgement message in response to a command from remote server 104 and user workstation 106. Such an acknowledgment message may be transmitted in response to a bootstrap command to download configuration 118 and/or upload usage log 120 to remote device 104. Upon receipt of a message, the monitoring logic 116 and/or wireless device control module 122 is operable to parse the message and determine the requested command.

In some aspects, data transmission between the wireless device 102 and remote devices, i.e., remote server 104 and user workstation 106, may be transmitted over a limited-access communications channel through wireless network 110. The communication channel may be set up based upon a limited service configuration 192 and may be used for transmitting usage log 120 to remote server 104 or for receiving control commands 126 and/or downloading at least portions of usage monitoring and reporting module 114, including usage configuration 118, to wireless device 102. The limited-access communications channel is generally not available to the end user and may be configured based on limited service setting 194 that identifies allowable types of communications, and the associated communication channels that may be utilized. Limited service configuration 192 may be downloaded over wireless network 110, may be locally transferred to wireless device 102, such as through a serial connection, or may be preloaded on the wireless device 102.

Referring back to FIG. 1, usage pattern manager server 104 may comprise at least one of any type of server, personal computer, mini computer, mainframe computer, or any computing device either special purpose or general computing device further comprising processor assembly 150. Further, there can be separate servers or computer devices associated with usage pattern manager server 104 that work in concert to provide data in usable formats to parties, and/or to provide a separate layer of control in the data flow between the wireless devices 102 and usage pattern manager server 104. Usage pattern manager server 104 (or plurality of servers) may, via communications module 152, send software agents or applications, such as any portion of usage pattern monitoring module 114 including usage configuration 118, to wireless device 102 across wireless network 110, such that the wireless device 102 returns information from its resident applications and subsystems 200. Usage pattern control module 130 may further include software, hardware, data, and generally any executable instructions operable to manage the collection, analysis, and reporting of usage logs 120 from wireless device 102.

Further, usage pattern control module 130 may include an information repository 136 for storing logs 120 received from wireless device 102. Information repository 136 may include any type of memory or storage device.

Additionally, usage pattern control module 130 may further comprise analyzer 142 for deriving wireless device usage patterns from the collected usage data in usage logs 120. Analyzer 142 may comprise one or any combination of hardware, software, firmware, executable instruction, data and analysis logic, such as decision-making routines, statistical programs, and combinations thereof, for analyzing and interpreting logs 120 and generating a usage pattern report 148. Report 148 or portions thereof may be transmitted to any predetermined entity, such as via e-mail, or may be made viewable locally or remotely, such as to an authorized user 108. Based upon review of report 148, and/or based upon a comparison of reports 148 taken over time, an authorized user 108 or other report recipient may observe and/or determine device usage trends that may be useful in determining products and services to offer to the wireless device, and/or to determine changes in the associated network to better suit the observed usage patterns. In another aspect, since the collected usage pattern information may include the wireless device type, such as based on the configuration ID 248 (FIG. 3), the analyzer 142 may develop usage pattern reports based on usage data collected from a plurality of the same wireless device types, and/or reports that compare usage patterns between wireless device types. Additionally, usage information may be accumulated from a plurality of network service providers, and reports, which may anonymous, may be generated comparing the usage pattern of devices associated with different network service providers.

Further, usage pattern control module 130 may include configuration generator module 140 which is executable to generate usage configuration 118 under control of an authorized user 108, such as marketing personnel for providers of components, content and/or services to the wireless device, and as previously disclosed, download all or a portion of usage pattern monitoring module 114, including configuration 118, to wireless device 102. Additionally, usage pattern control module 130 may "pull" usage log 120 based on commands from an authorized user 108, upon a request from usage pattern control logic 134, or the log 120 may be "pushed" from the wireless device 102.

Figure 3:
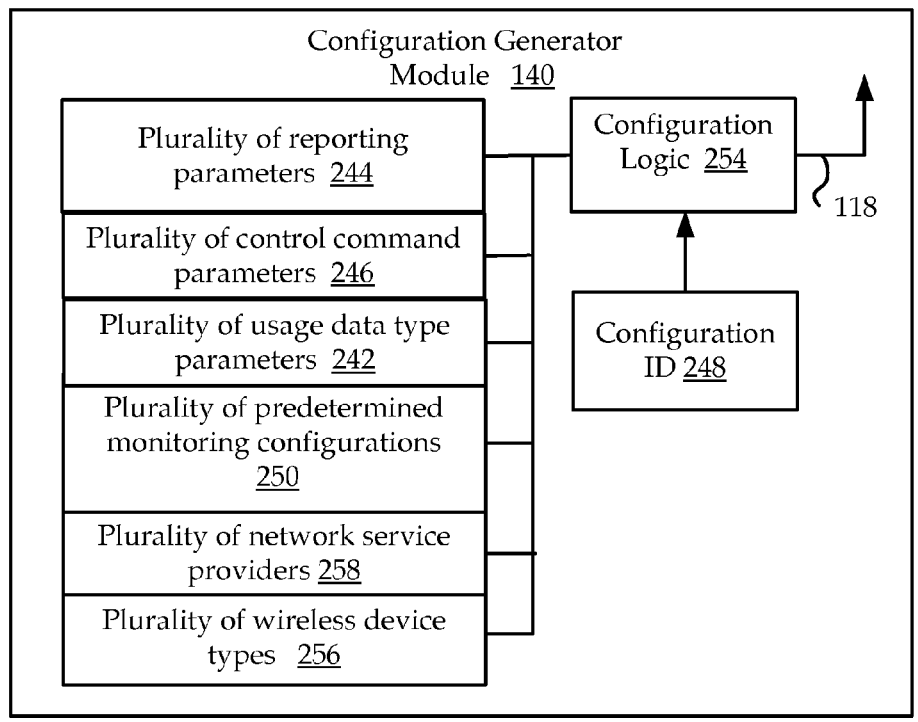
FIG. 3 is a schematic diagram of one aspect of an configuration generator module associated with the usage pattern control module of FIG. 1.

Referring to FIG. 3, usage pattern control module 130 may include configuration generator module 140 that includes hardware, software, firmware, executable instructions, data, and/or any other associated logic that allows the configuration generator module 140 to generate usage configuration 118. In one aspect, configuration generator module 140 may be operable to execute configuration logic 254 that assembles the various components of a given usage configuration 118 based on selections from a number of parameters. For example, different models of wireless devices may provide different capabilities. Accordingly, parameters that make up usage configuration 118 may vary depending on the type/make/model of the wireless device and/or the network service provider. As such, configuration logic 254 may provide a user with the ability to select from a menu of a plurality of wireless device types/models 256 and a plurality of network service providers 258 in order to generate an appropriate menu from which to select the parameters of usage configuration 118.

The plurality of usage data type parameters 242 enables an operator of the system, such as authorized user 108, to configure the usage pattern monitoring module to monitor, log, and report out any predetermined number of a plurality of types of usage data relating to any predetermined activity occurring on the device, when it occurs, for how long, and how frequently.

Furthermore, one or more reporting parameters may be selected specifying when usage log 120 is to be uploaded to remote server 104. Such a parameter may be selected from a plurality of reporting parameters 244 and, may include: upon the occurrence of a predetermined event, such as daily at a predetermined time, upon storing a predetermined number of entries and/or a predetermined amount of memory used, and/or upon power up of the wireless device 102; and in response to a request, such as upon command by a remote device, such remote server 104 and/or user workstation 106.

In addition, one aspect of configuration logic 254 may include plurality of control command parameters 246 operable to control access to the usage pattern monitoring module 114 and the reported logs. When operative, such a parameter may allow an authorized user to initiate an upload of usage logs 120 while preventing the same user from downloading a new configuration 118.

Furthermore, rather than selecting the various parameters individually, configuration logic 254 may provide the user with the ability to select from a menu of a plurality of predetermined usage configurations 250, which include predetermined groupings of the above-noted parameters that comprise authorization configuration 118.

Further, in one aspect, the selected one of the plurality of wireless device types/models 256 and the selected one of the plurality of network service providers 258 may be correlated to one or more of the plurality of usage data type parameters 242. For example, for an XYZ brand of wireless device operating on ABC wireless service provider, configuration logic 254 may be able to determine which usage monitoring, collecting and reporting capabilities the wireless device 102 should have installed, and thus may generate usage configuration 118 that includes the appropriate set of corresponding parameters.

Once the specific parameters of a given configuration 118 are determined, then configuration logic 254 may assign unique configuration ID 248 to the given configuration, and may store this configuration in a library for later recall, such as among plurality of predetermined authorization configurations 250. Further, configuration logic 254, and/or another component of usage pattern control module 130, may be operable to transmit usage configuration 118 to one or more wireless devices 102 to initiate the monitoring and logging of calls on that device.

Figure 4:
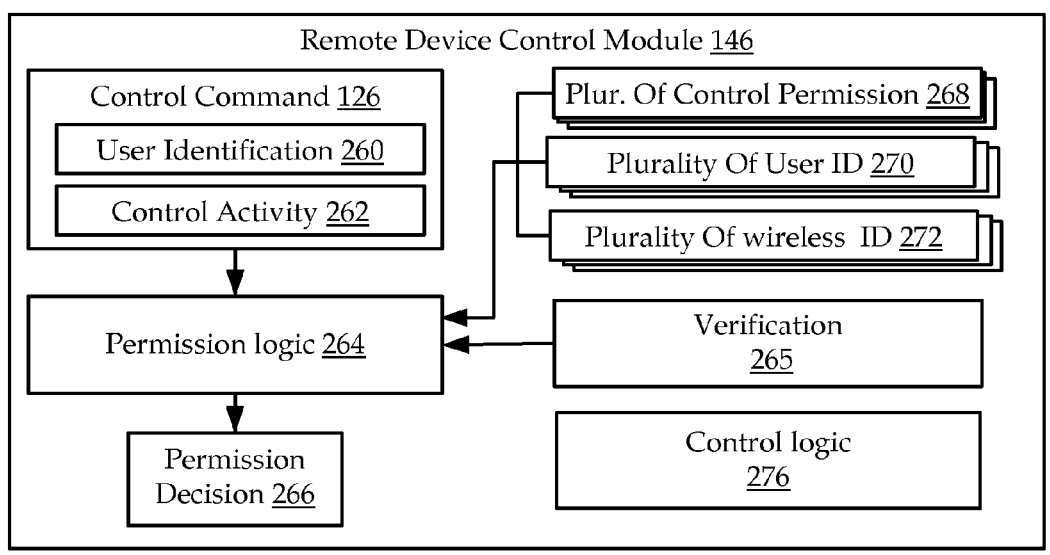
FIG. 4 is a schematic diagram of one aspect of a device control module associated with the usage pattern control module of FIG. 1.

Referring to FIG. 4, the usage pattern control module 130 may comprise a device control module 146 operable, by execution of control logic 134, to either execute control command 126 on wireless device 102 or transmit control command 126 to wireless device 102. In one aspect, for example, control command 126 may contain user identification ("ID") 260 and control activity 262. User ID 260 may be some manner of identifying the originator of control command 126, i.e. authorized user 108. For example, user ID 260 may be a name, a number, a digital signature, a hash, or any other type of data or value that may be associated with a party. Further, user ID 260 may not be explicitly contained in the control command 126, but rather may be derived from the origin of control command 126.

Control activity 262 may be an operation to be performed on wireless device 102 by usage pattern monitoring module 114 through executing control command 126. As mentioned above, these operations may include downloading at least portions of usage pattern monitoring module 114, initiating the uploading of logs 120, and the deleting logs 120. Before executing or forwarding the control command 126, device control module 146 may execute permission logic 264 to verify the sender's intent to perform the action, as well as to determine the authority of the user issuing control command 126. For example, verification 265 may be requested by wireless device 102 prior to uploading usage log 120 to, or downloading usage configuration 118 from, remote server 104.

To determine whether a user has authorization to issue control command 126, permission logic 264 may parse user ID 260 and control activity 262 from control command 126 and utilize a database of a plurality of user IDs 270 correlated with a plurality of control permissions 268, and correlated with a plurality of wireless device identifications (IDs) 272. Thus, based upon whether verification 265 is received and/or whether proper authorization is found, device control module 146 generates a permission decision 266, which determines whether or not to execute generated control command 126.

Control permissions 268 may identify one or more authorized control activities 262 for a given user ID 260 and/or wireless device IDs 272. For instance, certain users may be restricted to certain control activities, or to being able to control certain wireless devices. It should be rioted, however, that the plurality of user IDs 270, the plurality of control permissions 268 and the plurality of wireless device identifications (IDs) 272 may be correlated in any manner. For example, control command 126 may contain a user ID 260 of authorized user 108, and a control activity 262 of "upload current log" for a particular one of the plurality of wireless device identifications 270. Permission logic 264 searches the database of control permissions 268 and user IDs 270 to determine if the user 108 has the permission to disable executable instructions on the given wireless device 102.

The actual location of the disclosed components of the usage pattern control module 130 is non-limiting and may be physically located on a server or other device connected to wireless network 110.

In one aspect of system 100, authorized user 108 staffing user workstation 106 may be interested in how the usage pattern of the wireless device affects network products and/or service. In this case, for example, system 100 may allow for the analysis of cell site operations and planning of future cell site development based upon a usage pattern report 148 generated by remote server 104. In another aspect of system 100, authorized user 108 may include a marketing representative of an equipment maker and/or an entity that supplies a product and/or service to the wireless device 102. In this scenario, report 148 provides details of the usage patterns of all aspects of the wireless device 102, including call and messaging habits, and content and software consumption. Based on this information, content and service providers may tailor their available offerings to the wireless device 102. Report 148 may be transmitted, such as via e-mail, to the user workstation 106, or the report 148 may be made available for viewing on the remote server 104 without requiring the report 148 to be transmitted to the user workstation 106.

Further, in one aspect, authorized user 108 may download usage pattern monitoring module 114, or parts thereof, to one or multiple wireless devices 102 directly from the user workstation 106 to the wireless device 102. In other aspects, user workstation 106 may be a slave to remote server 104, requiring server 104 to validate the user 108 and to manage connectivity to the wireless devices 102.

Figure 5:
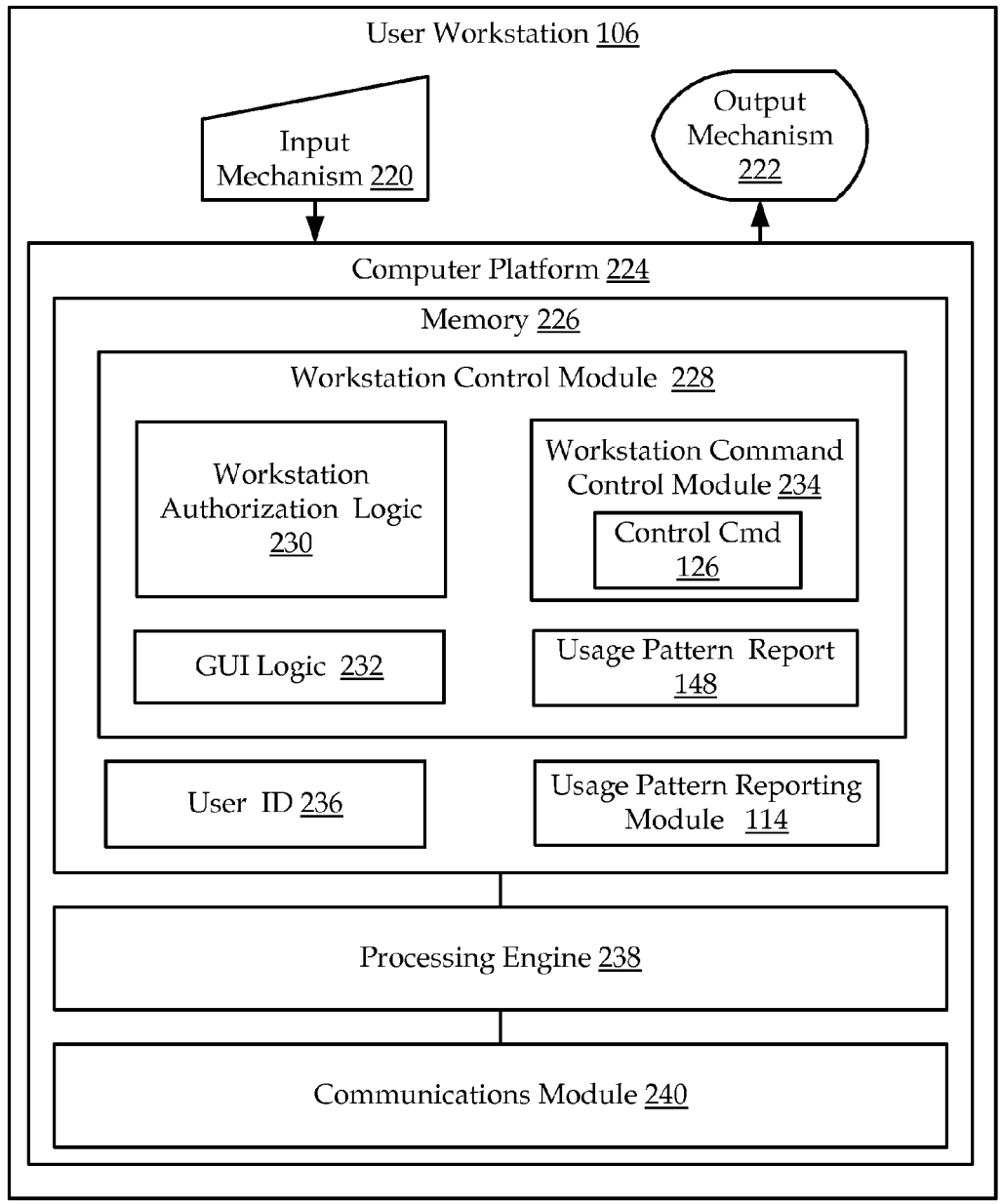
FIG. 5 is one aspect of an architecture diagram of the operator workstation of FIG. 1.

Referring to FIG. 5, user workstation 106 may comprise at least one of any type of server, personal computer, mini computer, mainframe computer, terminal, or any computing device either special purpose or general computing device operable to communicate with both wireless device 102 and remote server 104. In one aspect, user workstation 106 may comprise processing engine 238 and communications module 240. In other aspects, user workstation 106, may reside on any network device of wireless network 110, such as on usage pattern manager server 104, another server connected to the network, or even on a wireless device 102.

User workstation 106 may comprise an input mechanism 220, and an output mechanism 222 interconnected to computer platform 224. The input mechanism 220 and the output mechanism 222 may be similar to their respective counterparts 182, 184 on wireless device 102 and permits an authorized user 108 to interface with the user workstation 106 and via the workstation, with the usage pattern manager server 104 and ultimately with the wireless device 102. The workstation computer platform 224 may further comprise a memory 226 for storing applications and data files, a processing engine 238, and a communications module 240 operable to transmit and receive messages and data between the workstation 106, the remote server 104, wireless device 102, as well as any network component on wireless network 110.

Memory 226 may comprise a workstation control module 228 executed by processing engine 238. As the number of user workstations 106 and the number of authorized users 108 are non-limiting, user identification ("ID") parameter 236 may be entered into memory 296 by authorized user 108, and may be operable to identify the user of a particular workstation 106 to network components including remote server 104 and wireless device 102.

The workstation control module 228 may further include authorization logic 230 operable in conjunction with Graphic User Interface (GUI) logic 232, input mechanism 220, and output mechanism 222, to guide the user 108 through any analysis and command activity selection and transmission. The GUI logic 232 may control, for example, e-mail communication, report presentation, as well providing a menu for selecting and transmitting any control command 126 to usage pattern control module 130 and wireless device 102. Further, the workstation control module 228 may provide access to and/or may communicate with wireless device product and/or service providers, and/or network service providers, to provide the collected and analyzed usage pattern information for one or more wireless devices.

Wireless network 110 includes any communications network operable, at least in part, for enabling wireless communications between wireless device 102 and any device connected to wireless network 110. Further, wireless network 110 may include all network components, and all connected devices that form the network. For example, wireless network 110 may include at least one, or any combination, of: a cellular telephone network (as embodied in FIG. 4); a multicast network such as a Forward Link Only (FLO) network, such as the MediaFLO™ System available from Qualcomm, Inc. of San Diego, Calif.; a digital video broadcasting (DVB) network, such as DVB-S for satellite, DVB-C for cable, DVB-T for terrestrial television, DVB-H for terrestrial television for handhelds; a terrestrial telephone network; a satellite telephone network; an infrared network such as an Infrared Data Association ("IrDA")-based network; a short-range wireless network; a Bluetooth® technology network; a ZigBee® protocol network; an ultra wide band ("UWB") protocol network; a home radio frequency ("HomeRF") network; a shared wireless access protocol ("SWAP") network; a wideband network, such as a wireless Ethernet compatibility alliance ("WECA") network, a wireless fidelity alliance ("Wi-Fi Alliance") network, and a 802.11 network; a public switched telephone network; a public heterogeneous communications network, such as the Internet; a private communications network; and land mobile radio network.

Suitable examples of telephone networks include at least one, or any combination, of analog and digital networks/technologies, such as: code division multiple access ("CDMA"), wideband code division multiple access ("WCDMA"), universal mobile telecommunications system ("UMTS"), advanced mobile phone service ("AMPS"), time division multiple access ("TDMA"), frequency division multiple access ("FDMA"), orthogonal frequency division multiple access ("OFDMA"), global system for mobile communications ("GSM"), single carrier ("1X") radio transmission technology ("RTT"), evolution data only ("EV-DO") technology, general packet radio service ("GPRS"), enhanced data GSM environment ("EDGE"), high speed downlink data packet access ("HSPDA"), analog and digital satellite systems, and any other technologies/protocols that may be used in at least one of a wireless communications network and a data communications network.

Figure 6:
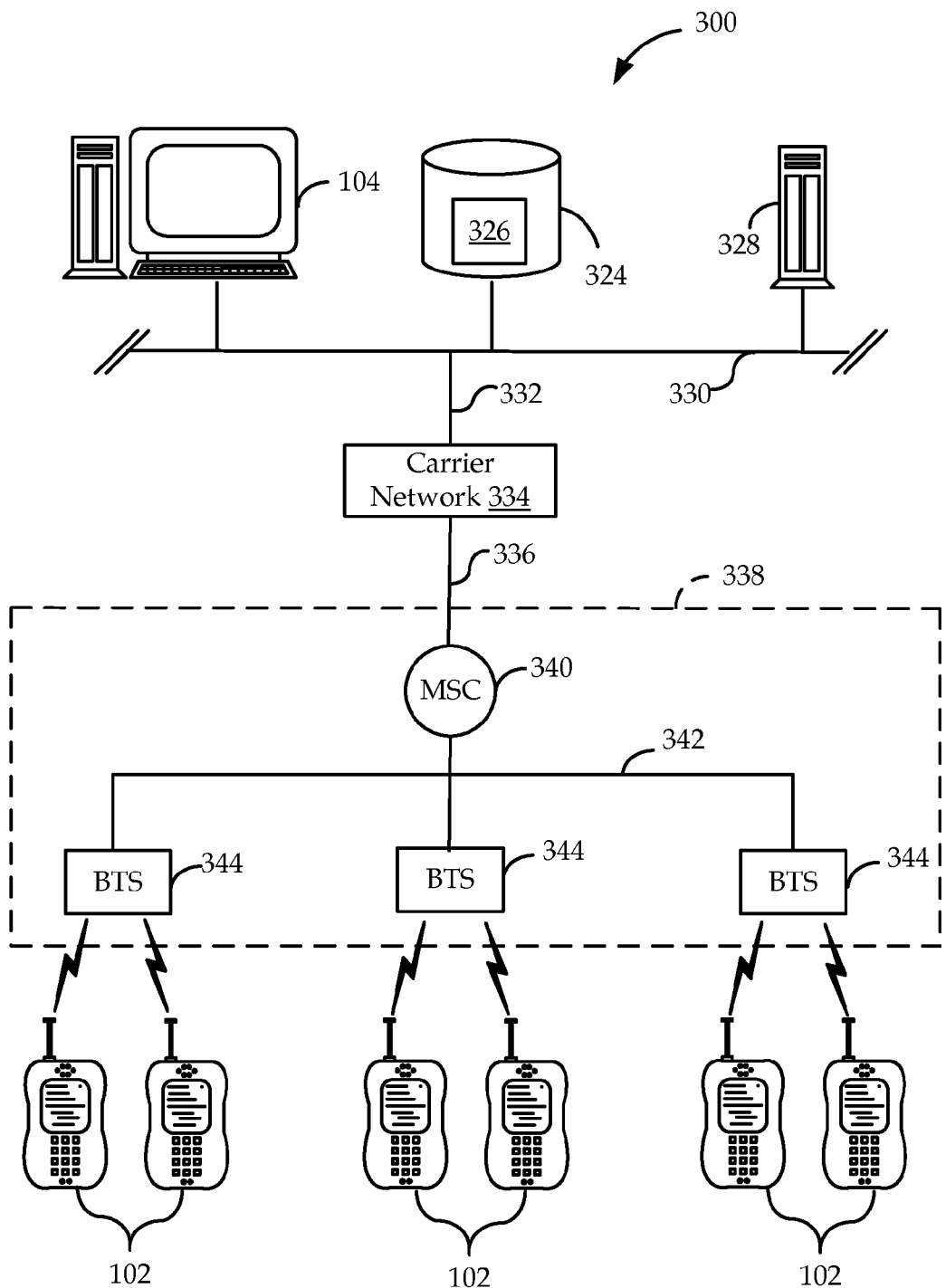
FIG. 6 is a schematic diagram of one aspect of a cellular telephone network aspect of FIG. 1.

Referring to FIG. 6, an aspect of a cellular wireless system 300 comprises at least one wireless device 102 and a cellular telephone wireless network 338 connected to a wired network 330 via a carrier network 334. Cellular telephone system 300 is merely exemplary and may include any system whereby remote modules, such as wireless devices 102 communicate packets including voice and data over-the-air between and among each other and/or between and among components of wireless network 338, including, without limitation, wireless network carriers and/or servers.

According to system 300, usage pattern manager server 104 may communicate over a wired network 330 (e.g. a local area network, LAN) with data repository 324 for storing data logs 326, gathered from wireless devices 102. Further, a data management server 328 may be in communication with usage pattern manager server 104 to provide post-processing capabilities, data flow control, etc. Usage pattern manager server 104, data repository 324 and data management server 328 may be present on the cellular telephone system 300 along with any other network components needed to provide cellular telecommunication services.

Usage pattern manager server 104, and/or data management server 328 may communicate with carrier network 334 through data links 332 and 336, such as the Internet, a secure LAN, WAN, or other network. Carrier network 334 controls messages (generally being data packets) sent to a mobile switching center ("MSC") 340. Further, carrier network 334 communicates with MSC 340 by a network 336, such as the Internet, and/or POTS ("plain old telephone service"). Typically, in network 336, a network or Internet portion transfers data, and the POTS portion transfers voice information. MSC 340 may be connected to multiple base stations ("BTS") 344 by another network 342, such as a data network and/or Internet portion for data transfer and a POTS portion for voice information. BTS 344 ultimately broadcasts messages wirelessly to the wireless devices, such as wireless device 102, by short messaging service ("SMS"), or other over-the-air methods.

Figure 7:
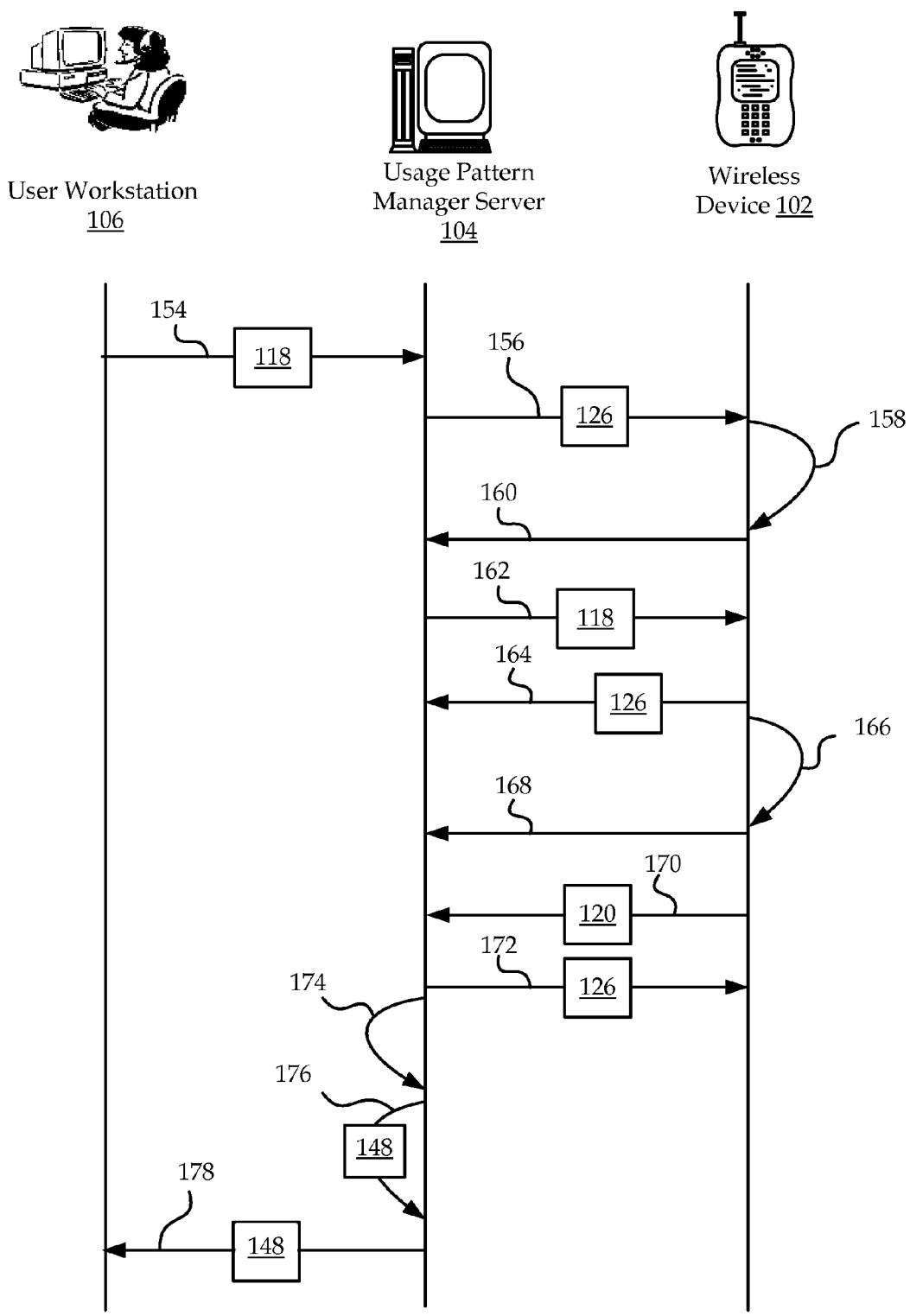
FIG. 7 is a message flow diagram associated with one aspect of the operation of the system of FIG. 1.

Referring to FIG. 7, a method for providing consumer usage pattern reports for a wireless device may initiate at step 154 with an authorized user 108 configuring at least a portion of usage pattern monitoring module 114 for subsequent downloading to a single or a selection of wireless devices 102.

In some aspects, the usage pattern monitoring module 114 may be absent from the wireless device 102 and may be "pushed" by a usage pattern control module 130 to the wireless device 102 or "pulled" from a usage pattern control module 130 by the wireless device 102 across a wireless network 110 to guarantee that the wireless device 102 has the latest software version. In another alternative, the pushing or pulling of the usage pattern monitoring module 114 to the wireless device 102 may be configurable in any manner, for example: being initiated by a predetermined event.

In other aspects, although a given wireless device 102 may already have usage pattern monitoring module 114 already in memory, it may not, however, have an up to date usage configuration 118. Generating and forwarding usage configuration 118 may include accessing usage pattern control module 130 on remote server 104 and executing configuration generator module 140. As previously disclosed, the generated usage configuration 118 may be forwarded to multiple wireless devices 102 under direction of the authorized user 108.

Configuration generator module 140 may utilize, configuration logic 254 to determine and/or customize the various parameters comprising usage configuration 118, and may vary depending on the type/make/model of the wireless device 102, the actual network service provider, and the usage types to be monitored and logged.

Upon command of authorized user 108, usage pattern control logic 134 may, at step 156, send a bootstrap command 126 to the usage pattern monitoring module 114 resident in memory 186 of a selected wireless device. The bootstrap command 126 may be sent over a limited communications channel via SMS or other over-the-air methods.

At step 158, the wireless device control module 122 may parse the bootstrap command 126, and optionally verify and/or authenticate the received message prior to execution. For example, wireless device control module 122 may execute the command immediately, or wireless device control module 122 may query the source of control command 126 to verify the control command before executing it. In another example, the device control module 122 may utilize permission logic 264 to check user ID 260 and/or control activity 262 associated with control command 126 against a permissions database to determine an authorization for the control command, thereby formulating permission decision 266. In yet another alternative, device control module 122 may request remote Server 104 to operate device control module 146 to verify and/or authorize control command 126.

Based upon successful verification or authentication of the bootstrap command 126, the usage monitoring and reporting module 114 may, at step 160 may establish a connection, such as an HTTP connection, with remote server 104 over wireless network 110.

At step 162, the usage monitoring and reporting module 114 may initiate a download of usage configuration 118 from the remote server 104. In another aspect, authorization configuration 118 may be forwarded through a static or serial connection to wireless device 102, or may be preloaded on wireless device 102 during the manufacture of the wireless device 102.

As previously disclosed, configuration 118 may comprise usage parameters 188 operable to control which calls are monitored and logged in usage log 120, reporting parameters 190 operable to control at what times, usage log 120 is uploaded to remote server 102, and access parameters 191 to determine what access to wireless device 102 is provided to remote devices.

After a successful download of usage configuration 118, a control command 126, comprising an acknowledgment, may be transmitted to the remote server 104 at step 164 to indicate successful transmission of the configuration 118.

At step 166, the monitoring logic 116 and reporting logic 117 may run as background processes, monitoring and logging wireless device usage based upon the parsed parameters of usage configuration 118.

At step 168, based upon reporting parameters 190, reporting logic 117 may establish, via communications module 202 and limited service configuration 192, an upload mechanism with remote server 104. Such an uploading mechanism may include a HTTP, HTTPS, an FTP, or other data transfer protocol.

In other aspects, at step 170, usage log 120 may be transferred from the wireless device 102 using any communication means or connection to which the wireless device 102 has access.

At step 172, the remote server 104 sends an acknowledgment message 126 to the wireless device 102 indicating successful upload of the usage log 120. In another aspect, log 120 may be received whole, or in pieces and assembled by usage pattern control module 130. In one aspect, usage pattern control module 130 may receive log 120 over wireless network 110, whereas another aspect may have the usage pattern control module 130 receive log 120 through a static or serial connection to the wireless device 102, or from some other computer device or storage media in communication with usage pattern manager server 130 and wireless device 102.

At step 174, analyzer/report generator 142 may process and analyze the collected log information 120 and at step 176, generate consumer usage pattern report 148 based upon that analysis.

At step 178 the usage pattern manager server module may provide access to and/or transmit the report 154 any predetermined party, such as authorized user 108 or even a party not directly affiliated with system 100, for further analysis and action. Further, report 148 may be generated and made viewable/transmitted on a configurable basis, such a daily, weekly, monthly; etc. Report 148 may include any form of output that represents analysis of log 120 and other information contained in the information repository 136, as well as any other associated information such as proposed network architectures, projected operating statistics, etc.

Although usage pattern control module 130 may generate report 148, module 130 and its corresponding components may be operable to present a ready view of usage data related information collected from the wireless devices 102 in any form, such as tables, maps, graphics views, plain text, interactive programs or web pages, or any other display or presentation of the data. For example, usage pattern control module 130 may present usage related information on a monitor or display device, and/or may transmit this information, such as via electronic mail, to another computer device for further analysis or review through such mechanisms as through HTTP, HTTPS, FTP, or some other data transfer protocol.

In another aspect, the system includes the distribution of the functionality described herein. For example, this aspect may include the distribution of a machine-readable medium comprising a first and second set of executable instructions. The first set of executable instructions, when executed by a machine, cause the machine to perform operations comprising generating a usage configuration executable to initiate monitoring, logging, and reporting of usage data on a wireless device, the usage configuration identifying a usage parameter and a reporting parameter. Further, the first set of instructions, when executed by the machine, cause the machine to forward the usage configuration for receipt by the wireless device. Additionally, the first set of instructions, when executed by the machine, cause the machine to receive a generated usage log from the wireless device based on the usage configuration. Additionally, the first set of instructions, when executed by the machine, cause the machine to generate a usage pattern report based on the received usage log. The second set of executable instructions, when executed by the wireless device, cause the wireless device to perform operations comprising obtaining the usage configuration, logging the usage data into a log based upon the usage parameter, and forwarding, based upon the reporting parameter, the usage log to the first machine to analyze usage patterns of the wireless device.

Thus, the described aspects allow for the collection and reporting of predetermined the usage patterns of a wireless device. Based on those reports, improved products and services may be marketed to the wireless device.

The various illustrative logics; logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative aspects and/or aspects, it should be noted that various changes and modifications could be made herein without departing from the scope of the described aspects and/or aspects as defined by the appended claims. Furthermore, although elements of the described aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of determining a usage pattern of a wireless device, comprising:
obtaining on the wireless device a configuration that comprises a usage parameter and a reporting parameter, wherein the usage parameter identifies wireless device usage data to be monitored, wherein obtaining on the wireless device comprises establishing a limited access communication channel across a wireless network based on a limited service configuration;
logging the identified usage data into a usage log based upon the usage parameter; and
forwarding, based upon the reporting parameter, the usage log to another device to analyze usage patterns of the wireless device.

2. The method of claim 1, wherein obtaining on a wireless device a configuration comprises receiving the configuration from a remote device over the wireless network.

3. The method of claim 1, wherein the usage parameter is selected from a plurality of usage parameters, and wherein the reporting parameter is selected from a plurality of reporting parameters.

4. The method of claim 1, wherein the usage parameter is selected from a plurality of usage parameters based on at least one of a type of the wireless device and an identity of a network service provider associated with the wireless device.

5. The method of claim 1, wherein logging usage data comprises logging at least one of an occurrence of an activity, or time-based data associated with the occurrence, or a duration of the predetermined activity, or a frequency of the occurrence, or a geographic location associated with the occurrence.

6. The method of claim 5, wherein logging the geographic location associated with the occurrence comprises logging at least one of a pseudo noise (PN) offset, or a system identification (SID), or a network identification (NID), or a base station identification (BSID).

7. The method of claim 5, wherein the activity comprises at least one of a call-related activity, or a messaging-related activity, or a browser-related activity, or a software application-related activity.

8. The method of claim 1, wherein the limited service configuration is predefined.

9. The method of claim 1, wherein forwarding the usage log to another device comprises forwarding via the limited-access communications channel.

10. The method of claim 9, wherein forwarding the usage log to another device comprises forwarding the usage log based upon at least one of a schedule, or an event, or a request by a remote device.

11. The method of claim 1, wherein the wireless device usage data comprises non-packet-based user activity information from a processing subsystem of the wireless device.

12. The method of claim 1, further comprising receiving a command that initiates deleting of uploaded usage logs from the wireless device.

13. A machine-readable medium comprising instructions which, when executed by a machine, cause the machine to perform operations comprising:
obtaining on the wireless device a configuration that comprises a usage parameter and a reporting parameter, wherein the usage parameter identifies wireless device usage data to be monitored, wherein obtaining on the wireless device comprises establishing a limited access communication channel across a wireless network based on a limited service configuration;
logging the identified usage data into a usage log based upon the usage parameter; and
forwarding, based upon the reporting parameter, the usage log to another device to analyze usage patterns of the wireless device.

14. The machine-readable medium of claim 13, wherein obtaining the configuration comprises receiving the configuration from a remote device over the wireless network.

15. The machine-readable medium of claim 13, wherein the usage parameter is selected from a plurality of usage parameters, and wherein the reporting parameter is selected from a plurality of reporting parameters.

16. The machine-readable medium of claim 13, wherein the usage parameter is selected from a plurality of usage parameters based on at least one of a type of the wireless device or an identity of a network service provider associated with the wireless device.

17. The machine-readable medium of claim 13, wherein logging usage data comprises logging at least one of an occurrence of an activity, or time-based data associated with the occurrence, or a duration of the activity, or a frequency of the occurrence, or a geographic location associated with the occurrence.

18. The machine-readable medium of claim 17, wherein logging the geographic location associated with the occurrence comprises logging at least one of a pseudo noise (PN) offset, or a system identification (SID), or a network identification (NID), or a base station identification (BSID).

19. The machine-readable medium of claim 17, wherein the activity comprises at least one of call-related activity, or messaging-related activity, or browser-related activity, or software application-related activity.

20. The machine-readable medium of claim 13, wherein the limited service configuration is predefined.

21. The machine-readable medium of claim 13, wherein forwarding the usage log to another device comprises forwarding via the limited-access communications channel.

22. The machine-readable medium of claim 13, wherein forwarding the usage log to another device comprises forwarding the usage log based upon at least one of a schedule, or an event, or a request by a remote device.

23. The machine-readable medium of claim 13, wherein the wireless device usage data comprises non-packet-based user activity information from a processing subsystem of the wireless device.

24. The machine-readable medium of claim 13, wherein the instructions cause the machine to perform operations further comprising receiving a delete command, wherein the delete command initiates deleting of uploaded usage logs from the wireless device.

25. At least one processor configured to perform the actions of:
obtaining on the wireless device a configuration that comprises a usage parameter and a reporting parameter, wherein the usage parameter identifies wireless device usage data to be monitored, wherein obtaining on the wireless device comprises establishing a limited access communication channel across a wireless network based on a limited service configuration;
logging the identified usage data into a log based upon the usage parameter; and
forwarding, based upon the reporting parameter, the usage log to another device to analyze usage patterns of the wireless device.

26. The at least one processor of claim 25, wherein obtaining the configuration comprises receiving the configuration from a remote device over the wireless network.

27. The at least one processor of claim 25, wherein the usage parameter is selected from a plurality of usage parameters, and wherein the reporting parameter is selected from a plurality of reporting parameters.

28. The at least one processor of claim 25, wherein the usage parameter is selected from a plurality of usage parameters based on at least one of a type of the wireless device and an identity of a network service provider associated with the wireless device.

29. The at least one processor of claim 25, wherein logging usage data comprises logging at least one of an occurrence of an activity, or time-based data associated with the occurrence, or a duration of the activity, or a frequency of the occurrence, or a geographic location associated with the occurrence.

30. The at least one processor of claim 29, wherein logging the geographic location associated with the occurrence comprises logging at least one of a pseudo noise (PN) offset, or a system identification (SID), or a network identification (NID), or a base station identification (BSID).

31. The at least one processor of claim 29, wherein the activity comprises at least one of call-related activity, or messaging-related activity, or browser-related activity, or software application-related activity.

32. The at least one processor of claim 25, wherein obtaining comprises establishing a limited-access communications channel across a wireless network based on a limited service configuration.

33. The at least one processor of claim 25, wherein forwarding the usage log to another device comprises establishing a limited-access communications channel across a wireless network based on a limited service configuration.

34. The at least one processor of claim 25, wherein forwarding the usage log to another device comprises forwarding the usage log based upon at least one of a schedule, or an event, or a request by a remote device.

35. The at least one processor of claim 25, wherein the wireless device usage data comprises non-packet-based user activity information from a processing subsystem of the wireless device.

36. The at least one processor of claim 25, further configured to perform the action of receiving a delete command, wherein the delete command initiates deleting of uploaded usage logs from the wireless device.

37. A wireless device, comprising:
means for obtaining on a wireless device a configuration that comprises a usage parameter and a reporting parameter, wherein the usage parameter identifies wireless device usage data to be monitored, wherein the means for obtaining on the wireless device comprises means for establishing a limited access communication channel across a wireless network based on a limited service configuration;
means for logging the identified usage data into a usage log based upon the usage parameter; and
means for forwarding, based upon the reporting parameter, the usage log to another device to analyze usage patterns of the wireless device.

38. The wireless device of claim 37, wherein the means for obtaining the configuration comprises means for receiving the configuration from a remote device over the wireless network.

39. The wireless device of claim 37, wherein the usage parameter is selected from a plurality of usage parameters, and wherein the reporting parameter is selected from a plurality of reporting parameters.

40. The wireless device of claim 37, wherein the usage parameter is selected from a plurality of usage parameters based on at least one of a type of the wireless device or an identity of a network service provider associated with the wireless device.

41. The wireless device of claim 37, wherein the means for logging usage data comprises means for logging at least one of an occurrence of an activity, or time-based data associated with the occurrence, or a duration of the activity, or a frequency of the occurrence, or a geographic location associated with the occurrence.

42. The wireless device of claim 41, wherein the means for logging the geographic location associated with the occurrence comprises logging at least one of a pseudo noise (PN) offset, or a system identification (SID), or a network identification (NID), or a base station identification (BSID).

43. The wireless device of claim 41, wherein the activity comprises at least one of call-related activity, or messaging-related activity, or browser-related activity, or software application-related activity.

44. The wireless device of claim 37, wherein the limited service configuration is predefined.

45. The wireless device of claim 37, wherein the means for forwarding the usage log to another device comprises means for forwarding via the limited access communications channel.

46. The wireless device of claim 37, wherein the means for forwarding the usage log to another device comprises means for forwarding the usage log based upon at least one of a schedule, or an event, or a request by a remote device.

47. The wireless device of claim 37, wherein the wireless device usage data comprises non-packet-based user activity information from a processing subsystem of the wireless device.

48. The wireless device of claim 37, further comprising means for receiving a delete command, wherein the delete command initiates deleting of uploaded usage logs from the wireless device.

49. A method of monitoring usage patterns of a wireless device, comprising:
generating a usage configuration executable to initiate monitoring, logging, and reporting of usage data on the wireless device, the usage configuration identifying a usage parameter and a reporting parameter;
forwarding the usage configuration for receipt by the wireless device, wherein forwarding the usage configuration comprises establishing a limited access communications channel across a wireless network based on a limited service configuration;
receiving a generated usage log from the wireless device based on the usage configuration; and
generating a usage pattern report based on the received usage log.

50. The method of claim 49, wherein generating the usage configuration includes generating the usage configuration for monitoring at least one of an occurrence of an activity, or time-based data associated with the occurrence, or a duration of the activity, or a frequency of the occurrence, or a geographic location associated with the occurrence.

51. The method of claim 49, further comprising transmitting at least a portion of the usage pattern report to another computer device.

52. The method of claim 49, further comprising providing remote access to at least a portion of the usage pattern report.

53. The method of claim 49, further comprising sending a control command to the wireless device based on the usage pattern report.

54. The method of claim 53, wherein the control command comprises a delete command that initiates deletion of uploaded usage logs from the wireless device.

55. The method of claim 49, further comprising selecting the usage configuration from a plurality of usage configurations based on at least one of a type of the wireless device or an identity of a network service provider associated with the wireless device.

56. The method of claim 49, wherein the wireless device usage data comprises non-packet-based user activity information from a processing subsystem of the wireless device.

57. At least one processor configured to perform the actions of:
   generating a usage configuration executable to initiate monitoring, logging, and reporting of usage data on a wireless device, the usage configuration identifying a usage parameter and a reporting parameter;
   forwarding the usage configuration for receipt by the wireless device, wherein forwarding the usage configuration comprises establishing a limited access communications channel across a wireless network based on a limited service configuration;
   receiving a generated usage log from the wireless device based on the usage configuration; and
   generating a usage pattern report based on the received usage log.

58. The at least one processor of claim 57, wherein generating the usage configuration includes generating the usage configuration for monitoring at least one of an occurrence of an activity, or time-based data associated with the occurrence, or a duration of the activity, or a frequency of the occurrence, or a geographic location associated with the occurrence.

59. The at least one processor of claim 57, further configured to perform the action of transmitting at least a portion of the usage pattern report to another computer device.

60. The at least one processor of claim 57, further configured to perform the action of providing remote access to at least a portion of the usage pattern report.

61. The at least one processor of claim 57, further configured to perform the action of sending a control command to the wireless device based on the report.

62. The at least one processor of claim 61, wherein the control command comprises a delete command that initiates deletion of uploaded usage logs from the wireless device.

63. The at least one processor of claim 57, further configured to perform the action of selecting the usage configuration from a plurality of usage configurations based on at least one of a type of the wireless device or an identity of a network service provider associated with the wireless device.

64. The at least one processor of claim 57, wherein the wireless device usage data comprises non-packet-based user activity information from a processing subsystem of the wireless device.

65. A machine-readable medium comprising instructions which, when executed by a machine, cause the machine to perform operations comprising:
   generating a usage configuration executable to initiate monitoring, logging, and reporting of usage data on a wireless device, the usage configuration identifying a usage parameter and a reporting parameter;
   forwarding the usage configuration for receipt by the wireless device, wherein forwarding the usage configuration comprises establishing a limited access communications channel across a wireless network based on a limited service configuration;
   receiving a generated usage log from the wireless device based on the usage configuration; and
   generating a usage pattern report based on the received usage log.

66. The machine-readable medium of claim 65, wherein generating the usage configuration includes generating the usage configuration for monitoring at least one of an occurrence of an activity, or time-based data associated with the occurrence, or a duration of the activity, or a frequency of the occurrence, or a geographic location associated with the occurrence.

67. The machine-readable medium of claim 65, wherein the instructions cause the machine to perform operations further comprising transmitting at least a portion of the usage pattern report to another computer device.

68. The machine-readable medium of claim 65, wherein the instructions cause the machine to perform operations further comprising providing remote access to at least a portion of the usage pattern report.

69. The machine-readable medium of claim 65, wherein the instructions cause the machine to perform operations further comprising sending a control command to the wireless device based on the report.

70. The machine-readable medium of claim 69, wherein the control command comprises a delete command that initiates deletion of uploaded usage logs from the wireless device.

71. The machine-readable medium of claim 65, wherein the instructions cause the machine to perform operations further comprising selecting the usage configuration from a plurality of usage configurations based on at least one of a type of the wireless device or an identity of a network service provider associated with the wireless device.

72. The machine-readable medium of claim 65, wherein the wireless device usage data comprises non-packet-based user activity information from a processing subsystem of the wireless device.

73. An apparatus, comprising:
   means for generating a usage configuration executable to initiate monitoring, logging, and reporting of usage data on a wireless device, the usage configuration identifying a usage parameter and a reporting parameter;
   means for forwarding the usage configuration for receipt by the wireless device, wherein the means for forwarding the usage configuration comprises means for establishing a limited access communications channel across a wireless network based on a limited service configuration;
   means for receiving a generated usage log from the wireless device based on the usage configuration; and
   means for generating a usage pattern report based on the received usage log.

74. The apparatus of claim 73, wherein the means for generating the usage configuration further comprises means for generating the usage configuration for monitoring at least one of an occurrence of an activity, or time-based data associated with the occurrence, or a duration of the activity, or a frequency of the occurrence, or a geographic location associated with the occurrence.

75. The apparatus of claim 73, further comprising means for transmitting at least a portion of the usage pattern report to another computer device.

76. The apparatus of claim 73, further comprising means for providing remote access to at least a portion of the usage pattern report.

77. The apparatus of claim 73, further comprising means for sending a control command to the wireless device based on the report.

78. The apparatus of claim 77, wherein the control command comprises a delete command that initiates deletion of uploaded usage logs from the wireless device.

79. The apparatus of claim 73, further comprising means for selecting the usage configuration from a plurality of usage configurations based on at least one of a type of the wireless device or an identity of a network service provider associated with the wireless device.

80. The apparatus of claim 73, wherein the wireless device usage data comprises non-packet-based user activity information from a processing subsystem of the wireless device.

81. An apparatus for managing the monitoring of a usage of a wireless device, comprising:
a configuration generator operable to generate and forward a usage configuration for receipt by the wireless device, the usage configuration identifying a usage parameter to monitor and a reporting parameter, wherein the configuration generator is operable to forward the usage configuration by establishing a limited access communications channel across a wireless network based on a limited service configuration;
an information repository operable to receive and store a usage log, the usage log comprising wireless device usage information based on the usage configuration; and
a usage pattern control module comprising an analyzer operable to generate a usage pattern report based on the usage log.

82. The apparatus of claim 81, wherein the usage parameter identifies for monitoring at least one of an occurrence of a predetermined activity, or time-based data associated with the occurrence, or a duration of the predetermined activity, or a frequency of the occurrence, or a geographic location associated with the occurrence.

83. The apparatus of claim 81, wherein the usage pattern control module is further operable to allow an authorized user to access the usage pattern report.

84. The apparatus of claim 81, further comprising a device control module operable to send a control command to initiate deletion of uploaded usage logs from the wireless device.

85. The apparatus of claim 81, further comprising a device control module operable to send a control command to change an operational characteristic of the wireless device.

86. The apparatus of claim 85, wherein the control command comprises a user identification and a control activity, and wherein the device control module further comprises permission logic operable to determine an authorization for executing the control command before sending the control command, the authorization based on at least one of the user identification and the control activity.

87. The apparatus of claim 85, wherein the device control module is operable to receive the control command from another computer device.

88. The apparatus of claim 86, wherein the other computer device is located across the wireless network.

89. The apparatus of claim 81, wherein the wireless device usage data comprises non-packet-based user activity information from a processing subsystem of the wireless device.

* * * * *